UNITED STATES PATENT OFFICE.

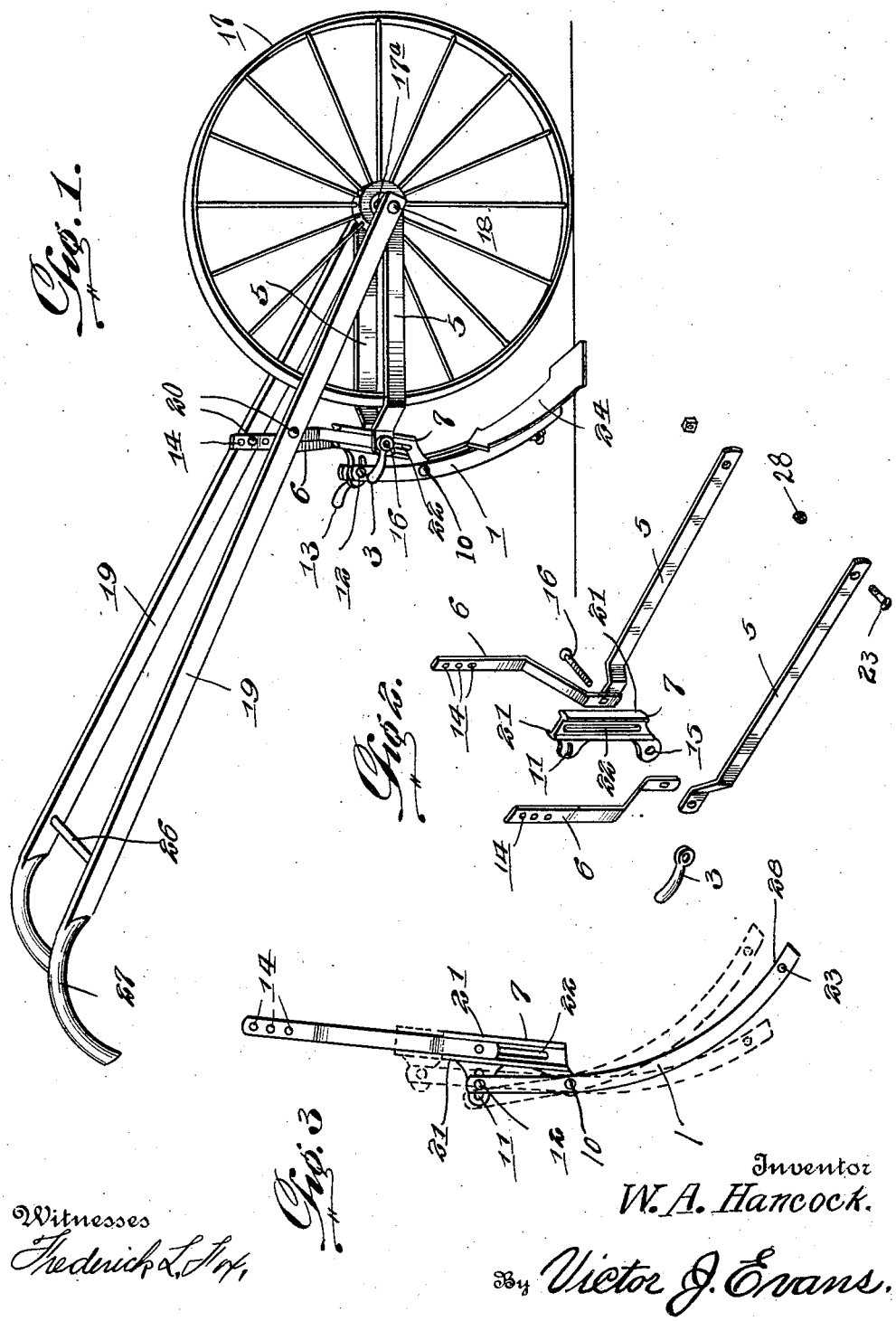

WILLARD A. HANCOCK, OF SUMMITVILLE, IOWA.

HAND-PLOW.

1,323,184.        Specification of Letters Patent.        Patented Nov. 25, 1919.

Application filed June 21, 1919. Serial No. 305,762.

*To all whom it may concern:*

Be it known that I, WILLARD A. HANCOCK, a citizen of the United States, residing at Summitville, in the county of Lee and State of Iowa, have invented new and useful Improvements in Hand-Plows, of which the following is a specification.

The object of my present invention is the provision of a hand plow which, without being unduly cumbersome or complicated or expensive, is possessed of material practical advantages as hereinafter described and definitely claimed.

In the accompanying drawings, hereby made a part hereof:

Figure 1 is a perspective showing the best practical embodiment of my invention of which I am cognizant.

Fig. 2 comprises disconnected perspectives of parts that enter into the novel hand plow.

Fig. 3 is a detail view, partly in full lines and partly in dotted lines, illustrative of the capacity of adjustment possessed by my novel construction of hand plow.

Similar numerals of reference designate corresponding parts in all of the views of the drawings.

Among other elements my novel hand plow comprises side bars 5 that receive between them a ground wheel 17, the latter being mounted to turn on a bushing 17ª that is slightly longer than the wheel hub, so that when a fastening bolt 18 is tightened against handle bars 19, the side bars 5 will be clamped against the bushing 17ª, with the result that free rotation of the wheel will be permitted while the bushing 17ª, side bars 5 and handle bars 19 will be securely fixed with respect to each other. The rear end portions of the side bars 5 are deflected inwardly to fit against the outer sides of handle braces 6, the lower portions of said handle braces 6 being deflected inwardly as shown, and terminating in lower portions that are arranged in parallelism. At their upper ends the handle braces 6 are connected to the bars 19 by bolts 20. It will also be noticed that for purposes of adjustment the handle braces 6 are respectively provided in their upper portions with a plurality of apertures 14 for coöperation with said bolts 20. At 7 is an upright carrying member, of I-form in cross-section, the flanges of said members being numbered 21, said flanges being adapted to receive between them the parallel lower portions of the handle braces 6. In the web of the member 7 is a longitudinal slot 22, and reaching rearwardly from said member 7 are upper and lower integral arms; the upper arm being provided with an arcuate slot 11 and the lower arm with an aperture 15. An adjusting bolt 16 is passed through the lapped apertured portions of the side bars 5 and handle braces 6 and also through the slot 22 in the carrying member 7, and said bolt 16 is threaded as shown, to receive a lever nut 3, disposed, by preference, at the right hand side of the plow. When the lever nut 3 is turned up on the bolt 16, the lower portions of the handle braces 6 will be forced in between the flanges 21 of the carrying member 7, with the result that the side bars 5 and the handle braces 6 will be securely fixed to each other and to the handle member 7. By particular reference to Fig. 3, it will be noticed that subsequently to loosening of the handle nut 3, the carrying member 7 may be moved upwardly and downwardly the full length of the slot 22 for adjustment purposes. The arcuate slot 11 in the upper arm of the carrying member 7 receives a threaded bolt 12 on which is mounted a lever nut 13; the said nut 13 being preferably located at the left-hand side of the plow, in order to avoid interference with the lever nut 3. The shank 1 of the plow preferably, though not necessarily, comprises two side by side bars as shown, the said shank being connected to the carrying member 7 by the bolt 12 and by a lower bolt 10, the latter for coöperation with the arm in which is the aperture 15. The said side by side bars of the shank 1 are connected together at their lower ends by a transverse bolt, rivet or analogous device 23, and are maintained in spaced relation by an interposed washer 28 on said bolt or rivet. Any tilling device may be used on the shank 1, a reversible shovel 24 being shown by way of example and being adjustably and detachably connected to the shank in the ordinary well known manner, or in any other manner compatible with the purpose of my invention. Manifestly when the handle nut 13 is slightly loosened, the lower end of the shank 1 may be moved backwardly or forwardly and may then be adjustably fixed, and in consequence the operator is enabled to adjust the tilling device 24 to the condition of the soil or to the working position of tilling device that he deems necessary to bring about the best results in cultivating, as well as for the comfort of the user. The handle bars 19 terminate at their rear ends in handholds 27, and are held in proper relation through the medium of a cross-bar 26. The apertures 14 in each handle brace permit of the handle bars being adjusted to suit the height of a tall operator or to provide for extra deep cultivation.

In practice when the tilling device 24 is set to suit the condition of the soil, and the operator is desirous of cultivating a little deeper or less deeply, he may attain the end desired by loosening the lever nut 3 and sliding the shank 1 upwardly or downwardly, as the case may be; the carrying member 7 then sliding on the bolt 16 and between the handle braces 6. The lever nut 3 may then be tightened to fix in adjustable manner the said parts with respect to each other. It will be noticed here that the raising or lowering of the shank 1 does not disturb the angle of the tilling device 24. When, however, it is desired to adjust the angle of the tilling device without affecting the depth of cultivation, the handle nut 13 may be loosened and the lower end of the shank 1 moved forwardly or rearwardly, and the lever nut 13 may then be tightened. With both of the lever nuts 3 and 13 tightened, all of the parts mentioned will be securely locked together in fixed relation, and this without entailing the employment of a wrench or other extraneous implement.

It will be apparent from the foregoing that because of the capacity of adjustment of my novel hand plow as described, the plow is susceptible of being used to advantage for a wide range of work, and at the same time the plow is short coupled, is compact in construction, and embodies but little material.

Having described my invention, what I claim and desire to secure by Letters-Patent, is:

1. In a hand plow, the combination of wheels bars, handle bars, handle braces, an upright carrying member of I-form in cross-section, having a longitudinal slot in its web and also having a lower rearwardly directed and apertured arm and an upper rearwardly directed arm in which is an arcuate slot, a bolt extending through apertures in the lapped portions of the wheel bars and handle braces and also through the slot in the carrying member and equipped with a nut, a shank pivotally connected to the lower arm of the carrying member, and a bolt extending through the arcuate slot in the upper arm of said member and the upper portion of the shank and equipped with a nut.

2. A carrying member for embodiment in a hand plow, the said carrying member being longitudinally channeled at its opposite sides and provided in its intermediate portion with a longitudinal slot, and being provided on one of its edges with a lower apertured arm and an upper arm in which latter is a slot.

3. In a hand plow, the combination of wheel bars, handle braces, an upright carrying member having channels in its opposite sides receiving the lower portions of the handle braces, and a bolt extending through the wheel bars, the handle braces and the slot of the carrying member and equipped with a nut.

4. In a hand plow, the combination of wheel bars, handle braces, a carrying member interposed between and connected to said bars and braces, a shank pivotally connected at an intermediate point of its length to the lower portion of said carrying member, and means for adjustably fixing the upper portion of the shank with respect to the upper portion of the carrying member.

5. In a hand plow, the combination of wheel bars, handle braces, a carrying member interposed between and connected to said bars and braces, and having a lower rearwardly directed and transversely apertured arm and also having an upper rearwardly directed arm in which is an arcuate slot, a shank pivotally connected to the lower arm of the carrying member and a bolt extending through the upper portion of the shank and the arcuate slot in the upper arm and equipped with a nut.

6. The combination in a hand plow, of wheel bars, handle braces, a carrying member interposed between and connected with said bars and braces and capable of upright adjustment, and a shank fulcrumed on the said carrying member and having its upper arm adjustably connected therewith.

In testimony whereof I affix my signature.

WILLARD A. HANCOCK.